United States Patent
Sandberg et al.

(10) Patent No.: US 7,079,243 B2
(45) Date of Patent: Jul. 18, 2006

(54) METHOD OF NOISE CANCELLATION IN AN UNPOLARIZED-LASER INSTRUMENT

(75) Inventors: Jon C. Sandberg, Erie, CO (US);
Quentin A. Turchette, Boulder, CO (US)

(73) Assignee: Research Electro-Optics, Inc., Boulder, CO (US)

(*) Notice: Subject to any disclaimer, the term of this patent is extended or adjusted under 35 U.S.C. 154(b) by 582 days.

(21) Appl. No.: 10/622,096

(22) Filed: Jul. 16, 2003

(65) Prior Publication Data

US 2004/0051870 A1    Mar. 18, 2004

Related U.S. Application Data

(60) Provisional application No. 60/396,311, filed on Jul. 16, 2002.

(51) Int. Cl.
*G01N 21/00* (2006.01)
*G01J 4/00* (2006.01)

(52) U.S. Cl. .................. 356/338; 356/343; 356/364

(58) Field of Classification Search ........ 356/335–343, 356/364–369; 250/574; 372/31
See application file for complete search history.

(56) References Cited

U.S. PATENT DOCUMENTS

| | | | | |
|---|---|---|---|---|
| 4,036,557 A * | 7/1977 | Christensen | .................. | 356/28 |
| 4,636,075 A | 1/1987 | Knollenberg | ................ | 356/336 |
| 4,798,465 A | 1/1989 | Knollenberg | ................ | 356/336 |
| 4,893,928 A | 1/1990 | Knollenberg | ................ | 356/336 |
| 5,085,500 A | 2/1992 | Blesener | ...................... | 356/338 |
| 5,090,808 A * | 2/1992 | Ishikawa et al. | ............ | 356/336 |
| 5,121,988 A | 6/1992 | Blesener et al. | ............ | 356/442 |
| 5,133,602 A * | 7/1992 | Batchelder et al. | ......... | 356/615 |
| 5,331,404 A | 7/1994 | Moeller et al. | ............. | 356/350 |
| 5,467,189 A | 11/1995 | Kreikebaum et al. | ....... | 356/336 |
| 5,548,404 A * | 8/1996 | Kupershmidt et al. | ...... | 356/368 |
| 5,655,035 A * | 8/1997 | Burmenko | .................... | 385/12 |
| 5,751,422 A | 5/1998 | Mitchell | ...................... | 356/337 |
| 5,805,281 A * | 9/1998 | Knowlton et al. | .......... | 356/336 |
| 5,805,781 A | 9/1998 | McIntyre et al. | ........... | 395/117 |
| 5,872,624 A | 2/1999 | Chambers et al. | ......... | 356/73.1 |
| 6,061,132 A | 5/2000 | Girvin et al. | ............... | 356/336 |
| 6,122,043 A | 9/2000 | Barley | ........................ | 356/73.1 |
| 6,414,754 B1 | 7/2002 | Johnson | ...................... | 356/338 |
| 2004/0051869 A1 * | 3/2004 | Sandberg et al. | ........... | 356/338 |

FOREIGN PATENT DOCUMENTS

WO    95/09354    4/1995

* cited by examiner

*Primary Examiner*—Hoa Q. Pham
(74) *Attorney, Agent, or Firm*—Greenlee, Winner and Sullivan, P.C.

(57) ABSTRACT

A method of noise reduction in a system where polarization mode fluctuations contribute to the noise in a signal is provided. Specifically, a corrected signal is formed by adjusting the relative and overall intensity of the orthogonal polarization components of an unpolarized laser source at a first detector positioned at a first angle with respect to the laser beam axis so that the first detector has the same sensitivity to polarization as a second detector positioned at a second angle with respect to the laser beam axis. This corrected signal is then subtracted from the signal at the second detector which detects a desired signal.

23 Claims, 6 Drawing Sheets

METHOD OF NOISE CANCELLATION IN AN UNPOLARIZED-LASER INSTRUMENT

CROSS REFERENCE TO RELATED APPLICATIONS

This application claims the benefit of U.S. Provisional Application No. 60/396,311 filed Jul. 16, 2002, which is incorporated by reference to the extent not inconsistent with the disclosure herewith.

BACKGROUND OF THE INVENTION

Unpolarized lasers are commonly used in a variety of applications, including instruments to optically detect and size particles down to 0.1 microns in diameter. These instruments measure the light scattered from particles as they pass through the laser beam. Determination of the size of the particle is determined by the amount of scattered light that is detected. The noise floor in these instruments comes from light scattered by the background molecular gas in the particle-laser interaction region (background scattering noise) and is of two types: a fundamental noise from the photon statistics (shot noise) present even in a perfect laser and technical background scattering noise from an imperfect laser source (technical background scattering). The background scattering noise reduces the sensitivity of the instrument. Shot noise is not reducible. To improve sensitivity, methods are here described to reduce the noise from technical background scattering.

In the highest-sensitivity system, the only source of noise would be the shot noise. However, there are other sources of noise (technical background scattering) that result in lowered sensitivity and therefore, result in an increase in the size of the smallest detectable particle. One of these additional sources of noise comes from laser amplitude fluctuations. These fluctuations appear as technical background scattering on the molecular-scattered light signal above the shot noise limit. One method used to reduce the noise from laser amplitude fluctuations is to monitor the laser output to determine the fluctuations in the laser amplitude and subtract these fluctuations from the scattered light signal (or in general, any other desired signal). This type of direct subtraction, however, does not work as well as expected in an unpolarized laser system. Unpolarized lasers, by definition, have continuously changing modes of polarization. Polarization mode fluctuations give rise to an additional noise term that cannot be directly subtracted. The noise caused by polarization mode fluctuations is not generally appreciated. It arises because the spatial pattern of the molecular-scattered light depends on light polarization, and the scattered light detection system collects only a finite solid angle. The net effect is a sensitivity of the detected scattered light that depends on the polarization of the laser light. The laser output monitor used in the simple amplitude noise subtraction method described above has a different sensitivity to polarization than the detector used for the scattered light, because the laser output monitor is effectively sampling a different spatial region than the scattered light detector. Typically, the output monitor light has no sensitivity to polarization. Therefore, if a direct subtraction method is used for technical background scattering, there is imperfect noise cancellation of laser amplitude fluctuations.

Some methods described to reduce noise in a laser system have been described. U.S. Pat. No. 4,798,465 (Knollenberg, Jan. 17, 1989) and continuation-in-part U.S. Pat. No. 4,893,928 (Knollenberg, Jan. 16, 1990) describe a particle detection device having background noise reduction. The noise reduction is achieved by use of a plurality of linear detectors, where each detector senses a portion of the optical path. The signals from the detectors are parallel processed to reduce the effect of background molecular scattering. U.S. Pat. No. 6,061,132 (Girvin, May 9, 2000) describes a particle counter having a dual detector array, wherein a detector in one array is used for noise cancellation, a detector in the other array is used to detect the signal from a particle, and the signals are subtracted to reduce the noise. U.S. Pat. No. 5,467,189 (Kreikebaum, Nov. 14, 1995) describes a particle sensor which subtracts background scattering signals from particle signals. U.S. Pat. No. 5,121,988 (Biesener, Jun. 16, 1992) describes a particle detector having monitoring of laser output power and adjustment of the current supplied to the laser to compensate. U.S. Pat. No. 6,414,754 (Johnson, Jul. 2, 2002) describes use of an ionic coloring agent on portions of the instrument to absorb stray light.

None of the described methods of noise reduction takes into account the effect of polarization mode fluctuations on technical background scattering. An improved method for canceling the laser amplitude noise in an unpolarized laser system is needed.

SUMMARY OF THE INVENTION

Provided is an improved method for canceling noise in an instrument which uses an unpolarized laser, and a system having improved noise cancellation. This invention improves the direct subtraction method described above, wherein the laser amplitude fluctuations are subtracted from a desired signal to create a desired signal having an improved signal-to-noise ratio. This invention recognizes the different polarization sensitivities that a reference monitor of the laser power and a detector of desired signals (for example, a scattered light detector) have and corrects the subtraction accordingly. This invention is useful in any system that contains two (or more) detectors with unequal sensitivities to the polarizations of light in which the signals of both detectors contain at least one of the same noise sources and only one of the detector's signals contains the desired signal.

Generally, a laser power reference detector that monitors the power of a laser (reference monitor detector) is positioned at a first angle with respect to the laser beam axis. The laser beam axis is defined as the axis along which the laser beam travels. The reference monitor detector may be positioned anywhere in the system as long as it detects the power of the laser and does not contain the desired signal. The reference monitor detector may be positioned along the laser beam axis, or at any angle with respect to the laser beam axis, as long as the angle of the reference monitor detector with respect to the laser beam axis is not the same as the angle of the signal detector with respect to the laser beam axis. The laser light of the first and second detectors can be decomposed into two orthogonal polarization states. For sake of clarity, the reference detector is taken to be along the output of the laser and the decomposition described herein is in terms of the linear polarizations termed s- and p-polarizations. These are defined specifically below. The invention does not rely on any particular decomposition of polarization. The reference monitor detector has a different sensitivity to the s- and p-polarizations of the laser beam than a signal detector positioned at a different angle with respect to the laser beam axis (for example a scattering detector used to detect scattered light from particles or molecules in the laser path) has because of the geometry of the system. This invention corrects the sensitivity of the reference monitor detector and the signal detector so that both detectors have the same sensitivity to the polarizations of the light prior to subtraction of the monitored laser reference signal from the signal at the signal detector. The correction described herein improves the noise cancellation in the desired signal. The correction can be carried out in different ways, as further described herein.

More specifically, provided is a method of noise reduction comprising: adjusting the relative and overall intensity of orthogonal polarization components of a laser source at a first detector (the reference monitor detector) positioned at a first angle with respect to the laser beam axis so the first detector has the same sensitivity to polarization as a second detector (the signal detector) positioned at a second angle with respect to the laser beam axis, forming a corrected signal; and subtracting the corrected signal from the signal at the second detector.

In another embodiment, provided is a method of reducing technical background scattering in the presence of polarization mode fluctuations from a detected signal comprising: separating the output of a laser source into orthogonal polarization components; detecting the intensity of the orthogonal polarization components using a first detecting element positioned at a first angle with respect to the laser beam axis, adjusting the relative intensity of the orthogonal polarization components and the overall intensity of the orthogonal polarization components so that the relative and overall intensity of the orthogonal polarization components at the first detecting element matches that of a second detecting element positioned at a second angle with respect to the laser beam axis, forming a polarization correction; and subtracting the polarization correction from the detected signal at the second detector, whereby the technical background scattering is reduced.

More specifically, provided is a method of noise reduction comprising: monitoring the power of a laser (either along the laser beam axis or elsewhere), forming a monitor signal; separating the monitor signal into s- and p-polarized components; adjusting the relative and overall amount of the s- and p-polarized components of the monitor signal so that the overall strength of the s-component of the monitor signal equals the amount of s-polarized component that a detector at a selected angle off the laser beam axis detects, forming a s-polarized component correction, and the overall strength of the p-component of the monitor signal equals the amount of p-polarized component that a detector at a selected angle off the laser beam axis detects, forming a p-polarized component correction; adding the s- and p-polarized component corrections, forming an overall corrected signal; subtracting the overall corrected signal from the signal detected at a selected angle off the laser beam axis. As used herein, "off the laser beam axis" means not directly along the laser beam axis.

Also provided is a noise-reduced laser system comprising:
a laser having an output along a laser beam axis; an adjustable polarizing element positioned at a first selected angle with respect to the laser beam axis; a detector in optical communication with the adjustable polarizing element;
a gain element in electrical connection with the detector; a scattering light detector positioned at a second selected angle which is not along the light path, in optical communication with the output of the laser; means for adjusting the adjustable polarizing element and the gain element so that the noise detected at the scattering light detector is reduced.

The detectors or detecting elements may be one or more detectors such as photodiodes, photomultiplier tubes, or any optical-to-electrical sensor, as known in the art. A "detecting element" may be two detectors (i.e., one for each orthogonal polarization) or may be a single detector, as described herein, or other configuration, as long as the desired signal may be measured. As used herein, "detector" or "detecting element" includes the actual detector, plus associated electronics, plus associated optical elements, as known in the art. The orthogonal polarization components of the laser source can be separated using any means known in the art, such as a polarizing beam splitter or a sheet polarizer. Laser sources that may be used in the invention include any unpolarized laser, such as a HeNe or other gas laser or a randomly polarized solid-state laser such as Nd:YAG with the laser operating in continuous-wave or pulsed configuration.

The adjustment of the relative intensity of the orthogonal polarization components may be performed by selecting the angle of a polarizing element in the optical paths of the components. The overall intensity of the orthogonal polarization components may be adjusted using one or more gain stages or other intensity adjusting element, as known in the art.

The adjustable polarizing element may be a polarizing sheet, a polarizing beam splitter, or other polarizing element as known in the art. The means for adjusting the adjustable polarizing element may be an angle-adjuster.

In one embodiment, the adjustable polarizing element comprises a polarizing beam splitter positioned along the light path that separates the output of the laser into orthogonal polarization output fractions, and an adjustable polarizing element positioned along the light path of the fractions.

As used herein, "canceling" or "reducing" noise or technical background scattering includes removal of some or all of the technical background scattering present in a signal due to laser amplitude noise in the presence of polarization mode fluctuations. As used herein, detectors having the "same sensitivity" to polarized light indicates that the correction as described herein causes an increase in the signal-to-noise ratio of the desired signal, not necessarily that the detectors have exactly the same sensitivity.

DETAILED DESCRIPTION OF THE INVENTION

The invention may be further understood by reference to the following description and figures, where like numbers indicate like features. There are many different embodiments of the invention. Three separate embodiments and three optical configurations of one embodiment are specifically illustrated here, however, as will be appreciated by those of ordinary skill in the art, other embodiments are possible. Any method or device that corrects for the different polarization sensitivity of a desired signal and a laser monitor signal in any way is intended to be included in this disclosure.

The correction for polarization sensitivity described herein is set once and depends only on the geometry of the two detectors, but does not depend on the polarization state of the laser, which in general is complicated, unknown and time-varying. In a preferred embodiment, the invention consists of a scattering detector to detect scattered light signal (scattered signal) and an output laser monitor detector system (monitor system). The signals from the monitor system are manipulated in such a way as to provide noise reduction in the scattered signal even under conditions of randomly fluctuating polarization. For ease of discussion, the scattering detector is considered to be fixed and its face defines the reference coordinate plane. Light polarized perpendicular to the plane of the scattering detector is p-polarized; light polarized parallel to the plane of the scattering detector is s-polarized. This invention does not rely on this particular orthogonal decomposition of polarization states—any decomposition will suffice. An arbitrary linear polarization of the laser can be expressed as a sum of the constituent s- and p-polarization components, $I_s$ and $I_p$, respectively. The total scattered signal at the detector is $$S_{scat} = I_s F_s + I_p F_p + S_{signal},$$

where the factors $F_s$ and $F_p$ are geometric factors derived from an integral over the detector spatial extent of the s- and p-polarization contributions from the background scattering. In general, $F_s$ is not equal to $F_p$. $S_{signal}$ is the desired signal and implicitly contains the noise contribution from the shot noise which is not reducable. In the preferred embodiment $S_{signal}$ is present only when particles traverse the laser cavity mode. This invention provides a monitor signal which has independent sensitivity to the output s- and p-polarized components. In general, the desired monitor signal is:

$$S_{mon} = G(I_s M_s + I_p M_p),$$

where G, $M_s$ and $M_p$ provide control over the relative and overall strength of the component signals, but in no way depend on $I_s$ or $I_p$. Note that the monitor signal does not include a contribution from $S_{signal}$. By satisfying the conditions $$GM_s = F_s; GM_p = F_p,$$

perfect noise cancellation (within shot noise limitations, satisfying $S_{scat} - S_{mon} = S_{signal}$) can be achieved for arbitrary polarization states of the laser.

Figure 1:
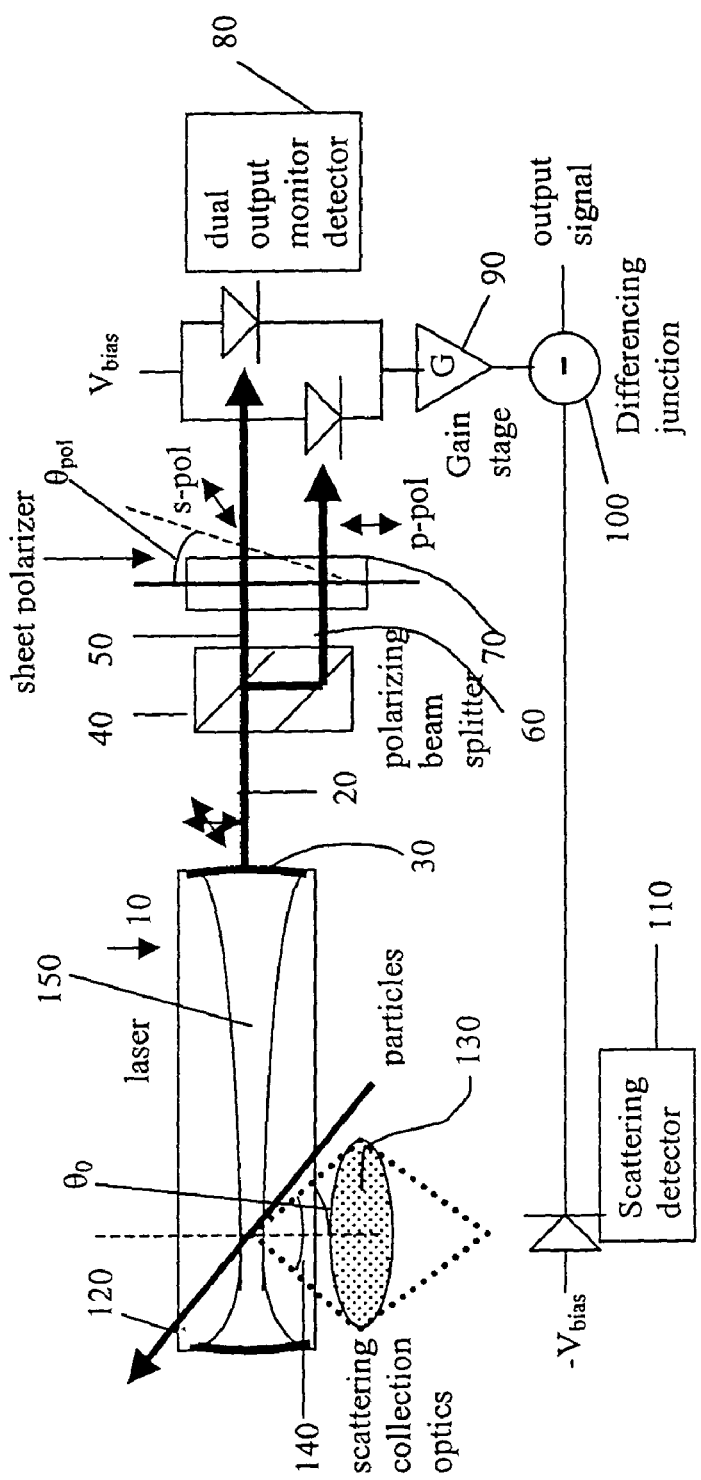
FIG. 1 shows an embodiment of the invention using a polarizing beam splitter, separate (and summed) detectors for the two orthogonal polarization states (s- and p-), a sheet polarizer for relative adjustment of the intensity of the two polarization components, and a single gain stage.

FIG. 1 shows one preferred embodiment of the invention. Consider only scattering in a plane containing the particle beam and perpendicular to the detector reference plane. A laser cavity 10 has intracavity light 150 having an optical axis that is parallel to laser beam axis 20. Particle beam 120 passes through intracavity light 150 and creates scattered light 140. Intracavity light 150 is transferred from the laser cavity 10 through partially reflecting mirror 30 through polarizing beam splitter 40, which separates the light into s- and p-polarized light beams (50 and 60, respectively). S- and p-polarized light beams pass through sheet polarizer 70 into dual output monitor detector 80. Signals from the dual output monitor detector 80 pass through gain stage 90. Gain stage 90 is electrically connected to differencing junction 100. Differencing junction 100 is electrically connected with scattering detector 110 which is positioned to collect scattered light 140 through scattering collection optics 130. Collection optics 130 collects a cone of light with half-angle $\theta_0$ and images this light onto scattering detector 110.

In operation, light from laser cavity 10 is passed through polarizing beam splitter 40, where the light is split into s- and p-polarizations. The s-polarized beam travels along path 50 and the p-polarized beam passes along path 60. The spatially-separated polarizations are passed through the same sheet polarizer 70. The angle $\theta_{pol}$ of sheet polarizer 70 allows adjustment of the relative amounts of the s- and p-polarizations of the beam at detector 80. Detector 80 can be two separate detectors (as shown) which are electrically summed (as shown, the cathodes are connected to one another, which sums the photocurrent from the two detectors), or one detector can perform the summing. One detector simplifies the instrument since only one photodiode is needed. A variable gain stage 90 with gain G completes the monitor optical/signal path and allows adjustment of the overall intensity of the light so that the laser amplitude noise is cancelled from the scattered signal.

In this case the scattering signal is given by:

$$S_{scat} = I_s\left(\theta_0 + \frac{1}{2}\sin 2\theta_0\right) + I_p\left(\theta_0 - \frac{1}{2}\sin 2\theta_0\right) + S_{signal}.$$

In this case, the total monitor signal is given by $$S_{mon} = G[I_s \cos^2 \theta_{pol} + I_p \sin^2 \theta_{pol}].$$

In order to properly cancel the noise, the scattering and monitoring signals must be set equal before the differencing junction. This can be achieved by setting the angle of the sheet polarizer and the gain of the gain stage to the values:

$$G = 2\theta_0; \theta_{pol} = \frac{1}{2}\cos^{-1}\left[\frac{\sin 2\theta_0}{G}\right].$$

If these conditions are met, the difference output signal ($S_{scat} - S_{mon}$) will have zero excess amplitude noise, and the system is shot-noise limited. In practice, no prior knowledge of the gain or angle is needed: the angle of the sheet polarizer and the gain are empirically adjusted until the noise is reduced to a desired level.

Figure 2:
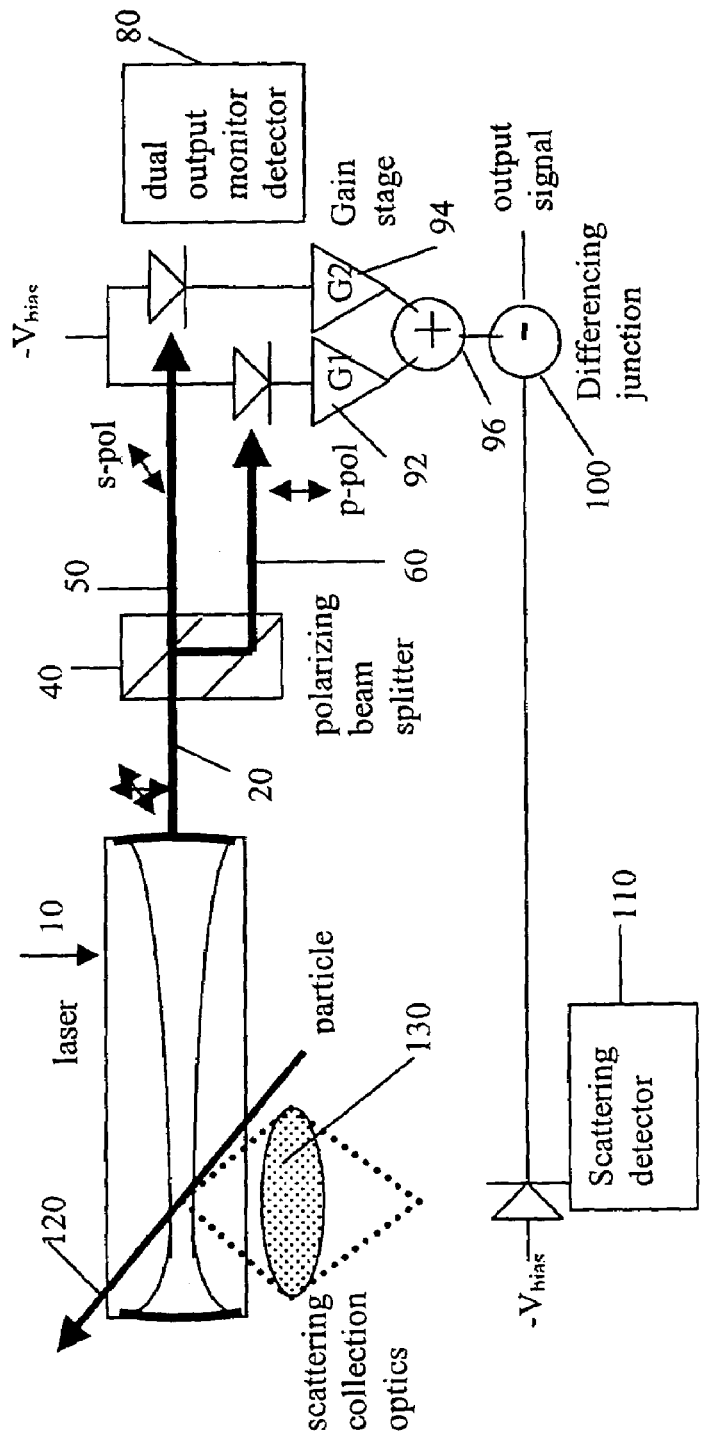
FIG. 2 shows another embodiment of the invention, similar to that of FIG. 1, but using separate gain stages for the relative polarization adjustment, and omitting the sheet polarizer.

In a second embodiment, shown in FIG. 2, the instrument is the same as shown in FIG. 1, except the sheet polarizer is removed. The spatially-separated s- and p-polarization components each illuminate their own detector. Each detector is then electrically connected to its own gain stage (92 and 94). The two gain stages G1 (92) and G2 (94) together provide both relative control and overall control and are set appropriately for maximum noise cancellation. The two gain stages are electrically summed (96) and then sent on to differencing junction (100).

Figure 3:
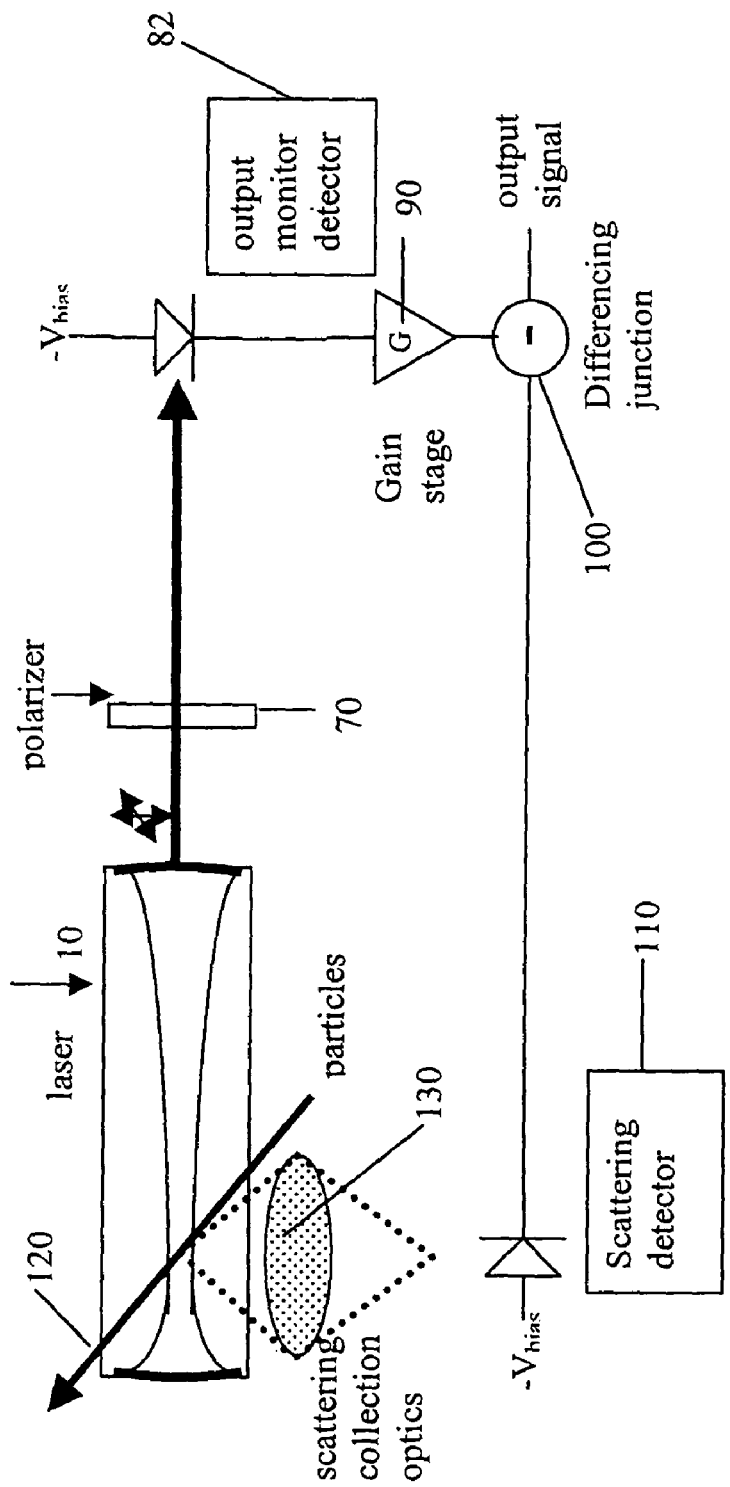
FIG. 3 shows one embodiment of the invention using a single polarizer, a single output monitor detector and a single gain stage.

In a third embodiment, shown in FIG. 3, there is only a single polarizer (70) (which can be a sheet polarizer or other polarizer, as known in the art) and a single detector (82).

There is thus no separation of the s- and p-polarization components. In the embodiment shown in FIG. 3, the angle of the polarizer 70 and the gain 90 are set so that the signal at 82 is the same as the signal at 110 when no particles are present in laser 10.

The first two embodiments described give noise cancellation of about a factor of 10 as compared to an uncorrected system. The third embodiment described gives a lower level of noise cancellation.

In a specific preferred embodiment, the invention is incorporated in an instrument based on a Helium-Neon laser used to detect and size particles passing through the intra-cavity laser beam. The laser cavity is formed by two mirrors, both of which have reflectivities around 99.99%. The intra-cavity power is on the order of 40 Watts. Some of the light that is transmitted out one of the mirrors forms the output monitor channel. The particles are introduced to the intra-cavity light via a nozzle or jet, forming a stream of particles that traverse the intracavity light. As a particle crosses the intracavity light, part of the light in the laser cavity is scattered off of the optical axis. At right angles to both the particle stream and the optical axis are collection optics which gather as much of the scattered light as is practical. The scattered light is imaged onto a silicon photodiode, converting the light to a photocurrent, which is measured and recorded. The size of the photocurrent determines the size of the particle. This instrument has a lower limit of sensitivity of 0.1 micron diameter particles. Present also in the scattered light is the light that is scattered from the residual air in the particle stream. The inherent noise (shot noise) on this background scattered light forms the ultimate noise floor on the instrument. However, the laser amplitude fluctuations can be more than ten times larger than the signal from the smallest particle. Therefore, some form of reference subtraction, as described herein needs to be used to obtain a better sensitivity.

Figure 4:
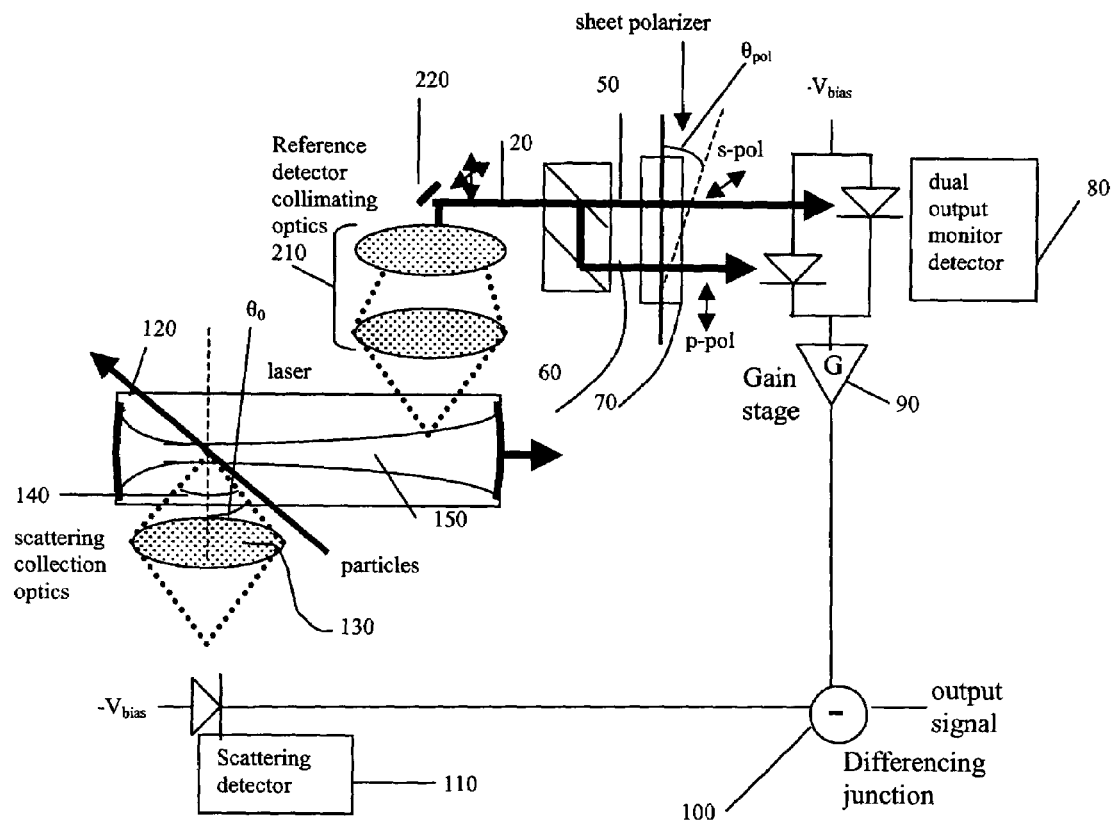
FIG. 4 shows one embodiment where the reference monitor detector is not along the laser beam axis.

FIG. 4 describes the embodiment generally described in FIG. 1 with the difference that the reference monitor detector is not along the laser beam axis. FIG. 4 shows the reference monitor detector 80 detecting scattered light from the laser source. The reference monitor detector 80 collects light from collimating optics 210, as known in the art. In FIG. 4, mirror 220 is shown to steer the reference light into the polarizing elements. However, this mirror is optional, as known in the art and the remaining elements in the system may be present in any location that is, or can be, optically connected with the reference light.

The configuration shown in FIG. 4 is merely illustrative of one embodiment where the reference monitor detector is not along the laser axis. Other configurations where the reference monitor detector is not along the laser axis are possible, as will be appreciated by one of ordinary skill in the art using the teachings described herein. In addition, it is to be understood the particular output monitor detecting system shown in FIG. 4 (sheet polarizer and dual output monitor detectors) can be substituted with any other embodiment described or shown herein, for example the configurations shown in FIGS. 2 and 3.

Figure 5:
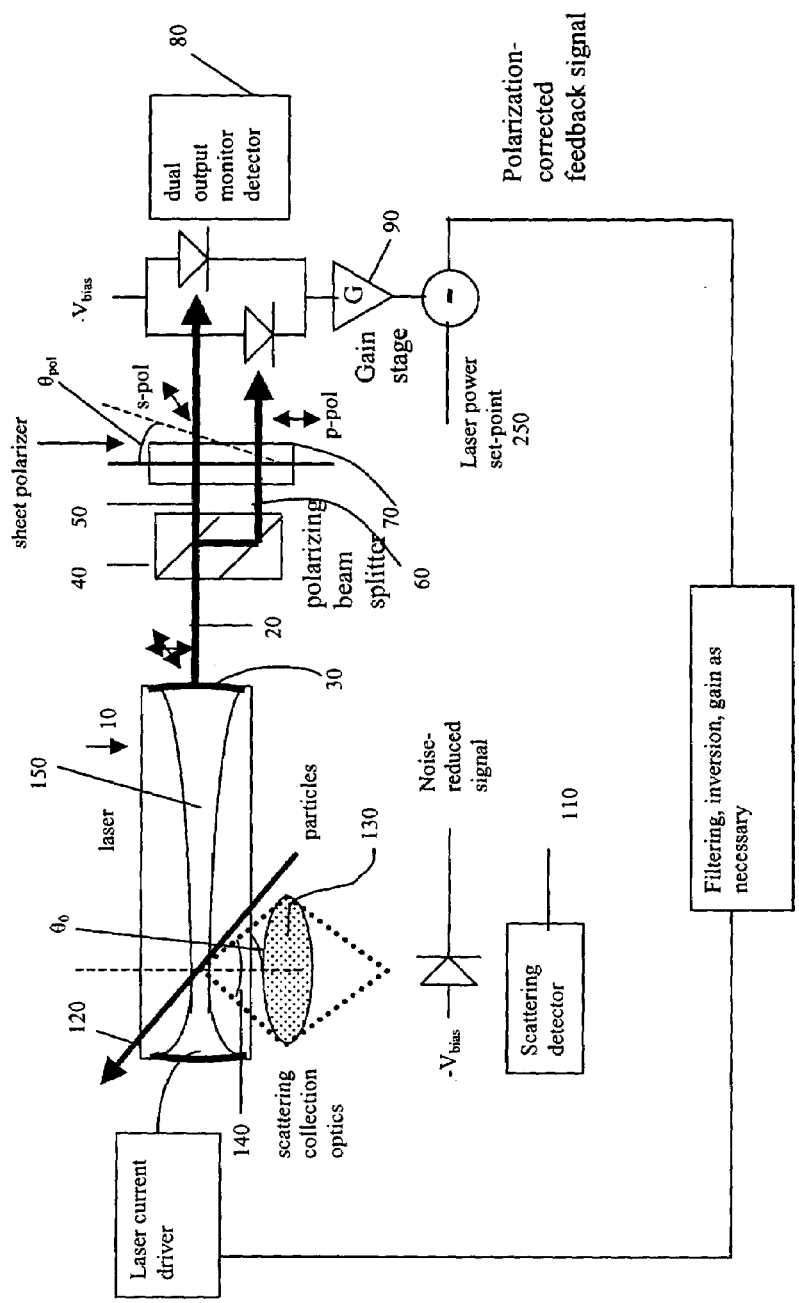
FIG. 5 shows an embodiment in which the technical background scattering at the scattering detector is reduced by feedback to a laser power control parameter.

The methods described herein can be used in an active method of noise cancellation. For active noise cancellation, it is desired to produce a technical background scattering free signal at the scattering detector by monitoring the power of the laser at another point: the reference monitor detector. In normal practice this is done by measuring the power at the reference monitor detector and feeding back to some element of the laser that controls its power. When the power in the laser is lower than a selected laser power setpoint, the laser current is increased to compensate for this and when the power is higher than a selected laser power setpoint, the laser current is dropped. This is a standard closed-loop feedback laser noise control system. In an unpolarized laser, the normal practice will not produce optimum results, since the reference detector and the scattering detector have different sensitivities to polarization—the scattering detector will have technical background scattering noise due to polarization mode fluctuations, as described above. In active noise cancellation with polarization compensation shown for example in FIG. 5, the signal from laser 10 is split into polarization components and the techniques described above are used to match the polarization sensitivities of the detectors involved. The signal after correction (after gain stage 90) is compared to a laser power set-point (250). As required, a parameter of the laser (current is shown in FIG. 5) is adjusted to compensate for increases or decreases in laser power. As shown in FIG. 5, and as known in the art, the feedback signal may be filtered, inverted or the gain may be adjusted as necessary. Active stabilization of laser intensity is generally known, but known methods of stabilization do not take into account polarization fluctuations of the laser signal. Polarization fluctuations are relevant when the desired noise reduced signal derives from a detector that is different from the detector used to actuate the feedback. Using the teachings described herein, active stabilization or laser intensity can contain correction for polarization fluctuations of the laser.

Figure 6:
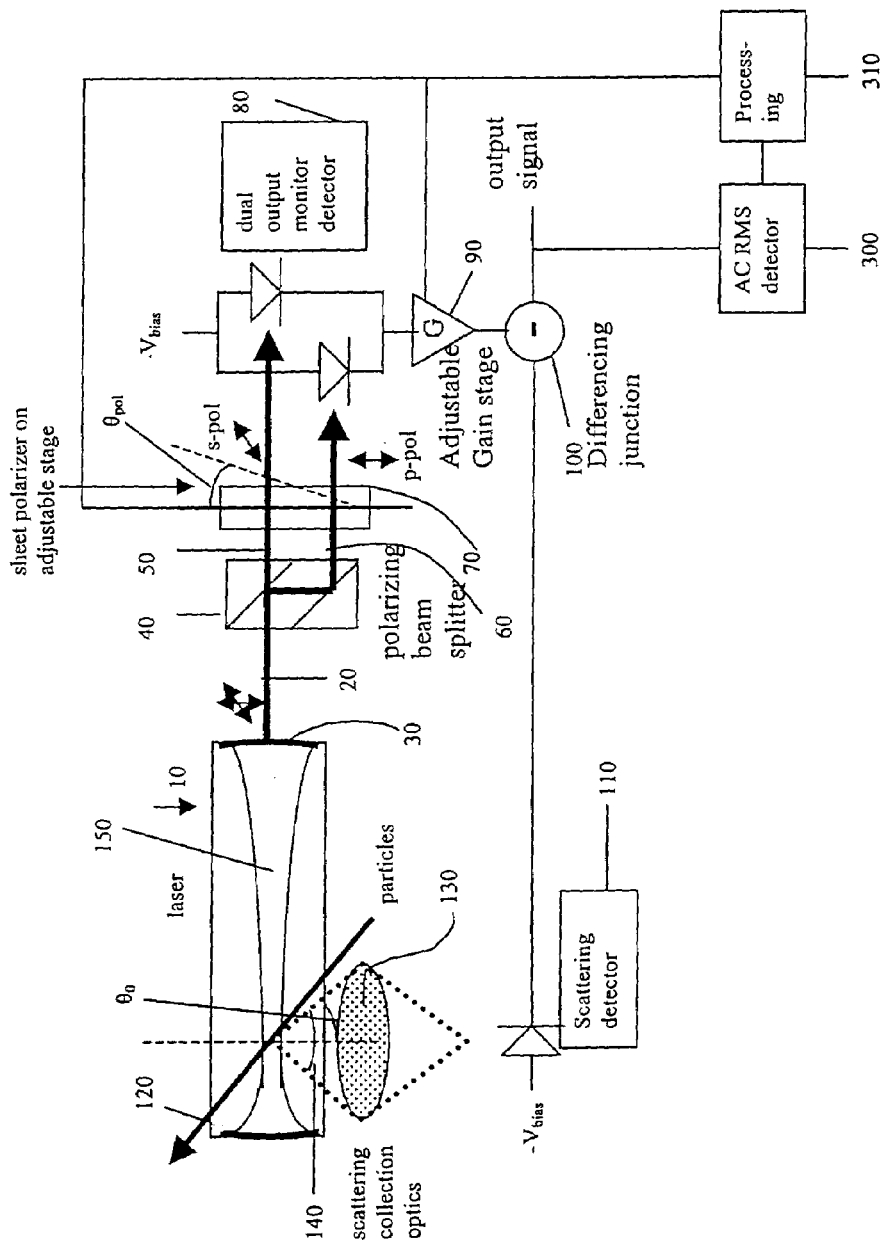
FIG. 6 shows an embodiment in which the noise reduction parameters are adjusted automatically.

In another embodiment of the invention, the noise cancellation in a polarization correction system can be automated. In its most general form, the desired signal is measured and a level of the noise level is established. Using the noise level, one of a number of parameters in the system can be adjusted to minimize the noise automatically, with no intervention from a user. For example, it is straightforward to measure the root-mean-square (RMS) noise in an electronic signal. The RMS noise can be measured, processed and fed into a programmable gain stage to automatically adjust the level of a compensating signal to minimize the RMS noise. Other elements which can be adjusted automatically by the processed signal include, but are not limited to electrical gain and filtering stages (analog or digital), electrooptic polarization optics and mechanically rotated or translated optical elements. This has the general benefit of eliminating any manual adjustment of signals in the set-up stage of an instrument, but also maintains optimal noise-cancellation when parameters are changing in the system due to change in environment. For example, the strength of the molecular background scattering signal depends on the atmospheric pressure in which the instrument is operated. As the ambient air density gets lower, the scattered signal size gets lower and therefore a gain in the system requires adjustment in order to maintain optimal noise cancellation. This can be done by measuring the noise directly to adjust the gain automatically or by measuring the atmospheric pressure and using this to adjust the gain. Ambient gas composition also affects the molecular-scattered signal size. One example of automated noise cancellation is shown in FIG. 6. In FIG. 6, the RMS noise is detected by detector 300. The RMS noise is processed, as required using processing 310 and a parameter of the system, for example the gain at 90 or the angle of the polarizer 70 is automatically adjusted to compensate for the RMS noise. Other parameters of the system are as described herein. One example of the processing of the noise is a microprocessor which determines the required parameter changes, applies them, and compares the noise magnitude before and after the parameter changes to determine if improvements have been made. This process of changing parameters and comparing noise levels can be repeated as necessary to determine optimal settings of the variable elements automatically and therefore optimal noise cancellation.

An additional factor that should be considered for maximum noise cancellation is the effect that different bandwidths of the electronics have on the signal. If the amplitude and phase of electronics in the two signal paths do not match, a different contribution from the electronics to the signal will create an imperfect cancellation. For maximum noise cancellation, the bandwidths of all electronic paths should be matched. This bandwidth or phase matching can be performed using a number of methods known in the art, including filters such as resistor-capacitor lowpass, bandpass, high-pass, lead-lag filters or others. Alternatively, the entire process could be performed in the digital domain using analog-to-digital converters and digital signal processing techniques as known in the art.

It should be noted that the desired level of noise cancellation for a given application may not require all aspects of noise cancellation described herein.

Although all adjustments to the signal are shown in the monitoring arm of the optical setup in the Figures shown and discussed herein, it is to be understood that this is not the only possible configuration. Those of ordinary skill in the art will recognize that the adjustments may be made in the scattering arm, or a combination of the two arms of the instrument. For example, some of the polarization optics could be incorporated in the scattering collection optics and some of the electronic gains and post-processing could be connected to the scattering photodiode. These embodiments are known to one of ordinary skill in the art with the teachings described herein.

Although the description above contains many specificities, these should not be construed as limiting the scope of the invention, but as merely providing illustrations of some of the preferred embodiments of the invention. For example, although the invention is particularly suited for systems designed to detect and size particles, the invention may be used in other systems, as known in the art. As long as there are two detectors in a system that have unequal sensitivities to the polarization of light, the correction as described herein can be applied. Any suitable laser system may be used, as known in the art. This invention may be used alone, or in conjunction with other methods to reduce the noise in a desired signal, as known in the art. All references cited herein are incorporated by reference to the extent not inconsistent with the disclosure herein.

We claim:

1. A method of noise reduction comprising:
adjusting the relative and overall intensity of orthogonal polarization components of a laser source at a first detector positioned at a first angle with respect to the laser beam axis so the first detector has the same sensitivity to polarization as a second detector positioned at a second angle with respect to the laser beam axis, forming a corrected signal, wherein said first angle and second angle are not equal;
subtracting the corrected signal from the signal at the second detector.

2. The method of claim 1, wherein the first detector is positioned along the laser beam axis and the second detector is positioned off the laser beam axis.

3. A method of reducing polarization mode fluctuation noise from a detected signal comprising:
separating the output of a laser source into orthogonal polarization components;
detecting the intensity of the orthogonal polarization components using a first detecting element positioned at a first angle with respect to the laser beam axis;
adjusting the relative intensity of the orthogonal polarization components and the overall intensity of the orthogonal polarization components so that the relative and overall intensity of the orthogonal polarization components at the first detecting element matches that of a second detecting element positioned at a second angle with respect to the laser beam axis, forming a polarization correction, wherein the first and second angles are not equal;
subtracting the polarization correction from the detected signal at the second detector, whereby the polarization mode fluctuation noise is reduced.

4. The method of claim 3, wherein the overall and relative intensity of the orthogonal polarization components is adjusted using two gain stages, each electrically connected to one orthogonal polarization component.

5. The method of claim 3, wherein the first detecting element comprises two detectors which each detect the intensity of one of the orthogonal polarization components.

6. The method of claim 3, wherein the separating is performed using a polarizing beam splitter.

7. The method of claim 3, wherein adjusting the relative intensity of the orthogonal polarization components is performed by selecting the angle of a polarizing element in the optical paths of the orthogonal polarization components.

8. The method of claim 7, wherein the polarizing element is a sheet polarizer.

9. The method of claim 3, wherein the overall intensity of the components is adjusted using a gain stage electrically connected to the first detecting element.

10. The method of claim 3, wherein the first detecting element is positioned along the laser beam axis and the second detecting element is positioned off the laser beam axis.

11. A method of noise reduction comprising:
monitoring the power of a laser source at a first selected angle with respect to the laser beam axis, forming a monitor signal;
separating the monitor signal into s- and p-polarized components;
adjusting the relative and overall amount of the s- and p-polarized components of the monitor signal so that the overall strength of the s- component of the monitor signal equals the amount of s-polarized component that a first detector at a second selected angle with respect to the laser beam axis detects, forming a s-polarized component correction, and the overall strength of the p- component of the monitor signal equals the amount of p-polarized component that the first detector detects, forming a p-polarized component correction, wherein the first selected angle and second selected angle are not equal;
adding the s- and p-polarized component corrections, forming an overall corrected signal; subtracting the overall corrected signal from the signal at the first detector.

12. The method of claim 11, wherein the first selected angle is along the laser beam axis.

13. The method of claim 11, wherein adjusting the relative intensity is performed by selecting the angle of a polarizing element in the optical paths of the components.

14. The method of claim 11, wherein the overall intensity of the components is adjusted using a gain stage.

15. A noise-reduced laser system comprising:
a laser having an output along a laser beam axis;
an adjustable polarizing element positioned at a first selected angle with respect to the laser beam axis;
a detector in optical communication with the adjustable polarizing element;
a gain element in electrical connection with the detector;
a scattering light detector positioned at a second selected angle which is not along the laser beam axis, in optical communication with the output of the laser;
means for adjusting the adjustable polarizing element and the gain element so that the noise detected at the scattering light detector is reduced.

16. The system of claim 15, wherein the adjustable polarizing element is positioned along the laser beam axis.

17. The system of claim 15, wherein the means for adjusting the adjustable polarizing element is an angle-adjuster.

18. The system of claim 15, wherein the adjustable polarizing element is a polarizing sheet.

19. The system of claim 15, wherein the adjustable polarizing element comprises a polarizing beam splitter and an angle-adjustable sheet polarizer.

20. The system of claim 15, wherein the laser is a He—Ne laser.

21. The system of claim 15, wherein the adjustable polarizing element comprises a polarizing beam splitter positioned along the laser beam axis that separates the output of the laser into orthogonal polarization output fractions, and an adjustable polarizing element in optical communication with the orthogonal polarization output fractions.

22. A method of actively reducing polarization mode fluctuation noise from a detected signal comprising:
separating the output of the laser source into orthogonal polarization components;
detecting the intensity of the orthogonal polarization components using a first detecting element positioned at a first angle with respect to the laser beam axis;
adjusting the relative intensity of the orthogonal polarization components and the overall intensity of the orthogonal polarization components so that the relative and overall intensity of the orthogonal polarization components at the first detecting element matches that of a second detecting element positioned at a second angle with respect to the laser beam axis, forming a polarization correction, wherein the first and second angles are not equal;
comparing a desired laser output setpoint to the intensity of the polarization correction;
adjusting the laser output so that the intensity of the polarization correction is the same as the desired laser output setpoint, whereby the polarization mode fluctuation noise is reduced.

23. A method of automated polarization mode fluctuation noise reduction from a detected signal comprising:
separating the output of a laser source into orthogonal polarization components;
monitoring the noise level of the laser source at a noise detector positioned at a first angle with respect to the laser output;
automatically adjusting either the relative or overall intensity of the orthogonal polarization components so that the noise level is reduced.

* * * * *